United States Patent [19]

Sato

[11] 4,330,179

[45] May 18, 1982

[54] VARIABLE MAGNIFICATION PROJECTION DEVICE

[75] Inventor: Shiro Sato, Hachioji, Japan

[73] Assignee: Konishiroku Photo Industry Co., Ltd., Tokyo, Japan

[21] Appl. No.: 148,814

[22] Filed: May 12, 1980

[30] Foreign Application Priority Data

May 17, 1979 [JP] Japan .................. 54/59661
May 17, 1979 [JP] Japan .................. 54/64875[U]

[51] Int. Cl.³ ..................... G02B 7/14; G02B 15/10
[52] U.S. Cl. ............................................. 350/422
[58] Field of Search ............... 350/422, 247, 254, 38; 355/55, 56, 57, 58; 354/197; 353/97, 101

[56] References Cited

U.S. PATENT DOCUMENTS

| | | | |
|---|---|---|---|
| 2,985,070 | 5/1961 | Lane | 350/422 |
| 3,476,478 | 11/1969 | Rees | 355/55 |
| 3,591,256 | 7/1971 | Hoyer et al. | 350/422 |
| 3,600,066 | 8/1971 | Delvecchio | 350/422 |
| 3,678,819 | 7/1972 | Gruber | 350/247 |
| 3,853,387 | 12/1974 | Demaine et al. | 350/422 |
| 3,882,520 | 5/1975 | Kamp et al. | 355/55 |

FOREIGN PATENT DOCUMENTS 51-18812  6/1976  Japan .

*Primary Examiner*—Jon W. Henry
*Attorney, Agent, or Firm*—Linda G. Bierman; Jordan B. Bierman

[57] ABSTRACT

A variable magnification projection device includes a principal lens displaceable along its optical path and at least a supplementary lens movable into and out of the optical path at a fixed conjugate distance from the principal lens as the latter is displaced. The supplementary lens is linearly movable along a sliding rail extending perpendicular to the optical path and is so coupled to a fixed frame of the device that as the principal lens is displaced along the path, it is automatically moved from a first position remote from the path to a second position in which its optical axis and that of the principal lens coincide.

2 Claims, 4 Drawing Figures

VARIABLE MAGNIFICATION PROJECTION DEVICE

BACKGROUND OF THE INVENTION

1. Field of the Invention

This invention relates to a variable magnification projection device applicable for us in an electrophotographic copying machine (hereinafter referred to as a copier). More particularly, the invention concerns an improved variable magnification projection device having a fixed conjugate distance and composed of the combination of a principal lens displaceable within a certain range along the axis of its optical path and a supplementary lens movable into and out of the optical path with said displacement of the principal lens.

2. Description of the Prior Art

The following description is provided, by way of example only, in the context of a copier, although it will be recognized that the invention has a generally wider range of potential applications.

In a conventional variable magnification projection device of fixed conjugate distance for a copier, a supplementary lens is arranged for movement into and out of the optical axis of a principal lens. Typically, the principal lens is disposed for displacement along its optical axis within a fixed or certain range and the supplementary lens is hingedly supported and engaged through linkage with the displacement mechanism of the principal lens so that movement of the supplementary lens out of and into fixed variable magnification positions along the optical path is achieved; such a system may be seen in Japanese Patent Publication No. SHO-51-18812, while a similar arrangement in a lens shutter system of a camera is disclosed in U.S. Pat. No. 3,476,478. However, the details of construction of both such devices are complex, and problems arise in their adjustment and repair as a consequence of their complicated arrangements.

Futhermore, obtaining a change of magnification in such devices of greater than 3 steps requires at least two separate supplementary lenses in stacks or having a large variation in the distance between the principal lens and each supplementary lens and further complicates the construction, notably decreasing its durability and accuracy.

SUMMARY OF THE INVENTION

The present invention provides a variable magnification device free from the above-mentioned problems and disadvantages. More particularly, the invention relates to a variable magnification projection device having a sliding rail for the supplementary lens and an opening in the rail through which the optical path passes. The sliding rail is fixed to a carriage—to which the principal lens is also fixed—for displacement within a predetermined range along the axis of the optical path, and extends substantially perpendicular to the optical axis or path of the principal lens. The supplementary lens is set in the sliding rail and is coupled through a cam arranged on a fixed frame so that as the carriage is displaced with respect to the frame, the supplementary lens enters the optical path (by movement along the sliding rail) from a given outside position at one side of the principal lens until its optical axis coincides with that of the principal lens; it thereafter returns to its original outside position when the carriage is further displaced in the same direction within the fixed range. The carriage is thus stopped at one fixed position in which the supplementary lens is disposed out of the principal lens axis, and at another fixed position in which the optical axis of both lenses coincide.

Put another way, the variable magnification projection device of the present invention provides a simple and compact construction wherein the supplementary lens is moved along the sliding rail perpendicular to the optical path of the principal lens, by means of a cam, from only one outside position with respect to the principal lens. It is therefore possible to provide two supplementary lenses on the sliding rail at opposite sides of the principal lens or optical axis thereof and to individually move them into and out of the optical path of the principal lens without mutual interference. As a consequence, variable magnification of 3 steps—or even 4 steps—as well as of 2 steps can be readily obtained without using more than two supplementary lenses in the inventive variable magnification device, and its assembly, adjustment and repair are simple while providing excellent durability for stable use.

These and other objects, novel features and advantages of the invention will become more apparent from the following detailed description of preferred embodiments thereof when taken in conjunction with the accompanying drawings.

DETAILED DESCRIPTION OF THE PREFERRED EMBODIMENTS

Figure 1:
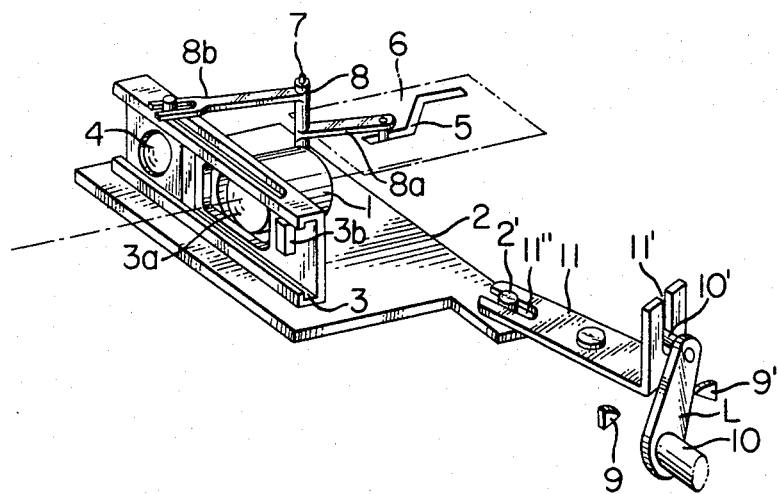
FIG. 1 is an elevated perspective view of a first embodiment of a variable projection magnification device in accordance with the invention.
Figure 2:
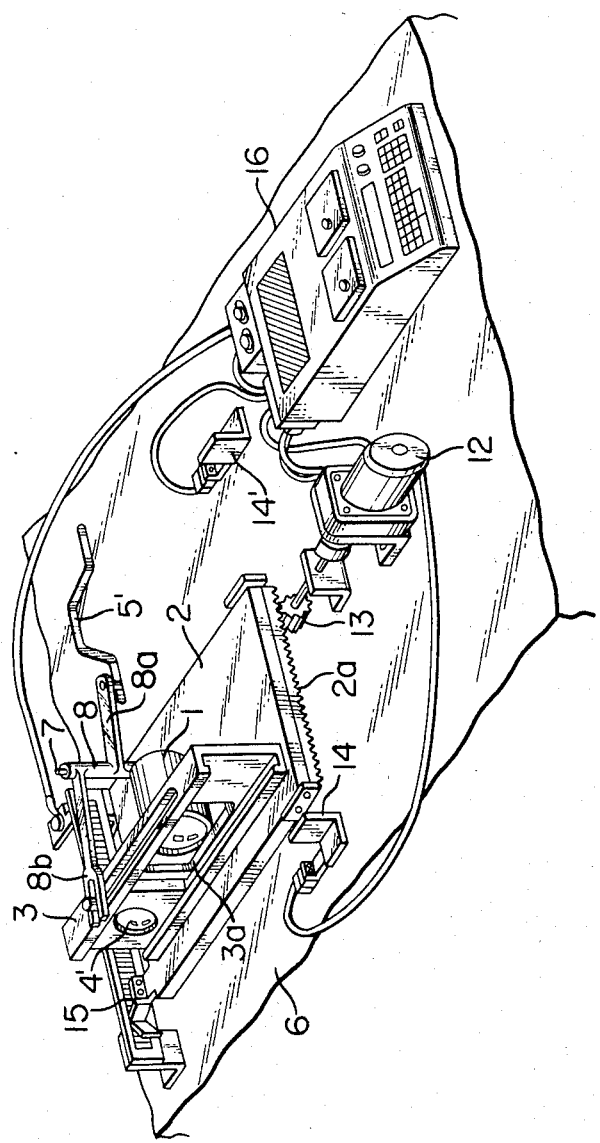
FIG. 2 is an elevated perspective view of a second embodiment incorporating the invention.
Figure 4:
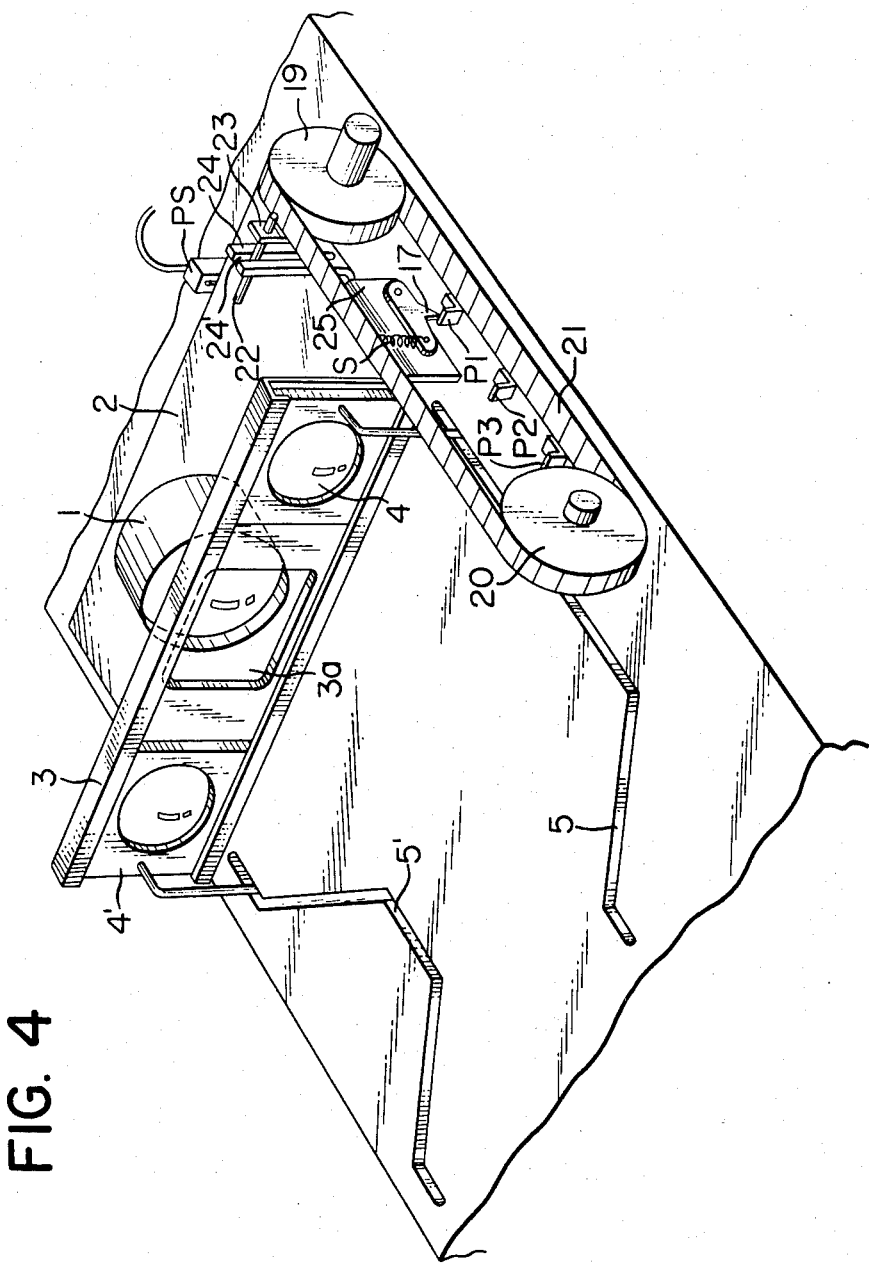
FIG. 4 is an elevated perspective view of a third embodiment of the invention.

In the drawings, reference numeral 1 represents a principal lens that generally performs full-size magnification projection, 2 designates a carriage on which principal lens 1 is fixed and which is displaceable along the axis of the optical path as so guided by a rail or guide means, and 3 is sliding rail for a supplementary lens. Sliding rail 3 is also fixed to carriage 2 and extends substantially perpendicular to the optical path of principal lens 1; an opening 3a is defined in rail 3 so as not to block or shield the optical path of principal lens 1 when the supplementary lens is not being used. Numerals 4 and 4' designate supplementary lenses set in sliding rail 3, and 5 and 5' denote guide means (referred to hereinafter as cam means) formed in a fixed frame 6 as grooves. In the embodiments of FIGS. 1 and 2, supplementary lens 4 (or 4') is coupled with cam 5 (or 5') through a cam follower lever 8 having a cam follower arm 8a and a slider link arm 8b and being universally pivotable about a stay 7 fixed to carriage 2. Cam follower arm 8a and slider link arm 8b are elongated in respectively opposite directions about stay 7, follower arm 8a carrying a pin or cam follower (no reference symbol) at an end thereof for engagement with cam means 5 (or 5'), and the free end of link arm 8b being fork-like for engagement with a pin (no reference symbol) mounted on the holder of supplemental lens 4 (or 4'). In the apparatus of FIG. 4, holders of supplementary lenses 4 and 4' are coupled with respective guide means 5 and 5' through cam followers (no reference symbol) which are fixed to the lens holders at one end thereof.

When carriage 2 is displaced to the right (in FIGS. 1 and 2) along the optical axis of principal lens 1, supplementary lens 4 (in FIG. 1) is moved by cam 5 from a first position outside of or remote from the optical axis or path to a second position in which its optical axis coincides with that of principal lens 1, and is then stopped. On the other hand, supplementary lens 4' (in FIG. 2) is likewise moved by cam 5' from a first position outside of the axis of principal lens 1 to a second position wherein its axis coincides with that of principal lens 1, is there stopped for a predetermined period, and is then returned to its original, first position remote from the optical path, cam means 5' being symmetrically defined about its central or stopping portion.

Sliding rail 3 in FIG. 1 includes a stopper 3b for stopping or regulating movement therealong of supplementary lens 4. Stopper 3b serves to insure that neither the clearance between cam 5 and the cam follower, nor the clearance between slider link arm 8b of cam follower lever 8 and the pin mounted on the holder for supplementary lens 4, in conjunction with the elasticity of cam follower lever 8, will not adversely influence the accuracy of coincidence of the optical axes of the lenses. Alternatively, a spring load or urgency may be applied to supplementary lens 4 in one direction along the sliding rail extension, such alternative means being provided in the embodiment of FIG. 2 (although not specifically illustrated therein.)

In FIG. 4, as carriage 2 is displaced along the optical axis to the left from the position shown, the optical axis of supplementary lens 4' which is initially remote from the primary optical path of principal lens 1 is first moved into axial coincidence with principal lens 1, and then returned to its original or initial position by engagement of its cam follower with cam 5'; supplementary lens 4 begins its movement toward the position where its optical axis coincides with that of principal lens 1 from a point at which supplemental lens 4' has been approximately halfway returned to its original outside or remote position, and is there stopped. Since a corresponding lens stopper can not be provided in the FIG. 4 apparatus, a tension spring (not shown) is instead stretched between the cam followers of supplementary lenses 4 and 4' so that the clearance space or play between each cam 5, 5' and its respective cam follower does not influence the accuracy of coincidence of the optical axes of the principal and supplementary lenses. Rather, supplementary lenses 4 and 4' are pulled by the spring toward each other and the optical axis of principal lens 1.

Next follows an explanation of the driving and stopping mechanism for carriage 2 in each of the disclosed embodiments.

The carriage 2 in FIG. 1 is displaced along the axis of the optical path by an oscillating crank shaft 10 bearing a lever L and regulated or stopped by stoppers 9 and 9' fixed to the body of the device. A pivotable swing lever 11 is centrally fulcrumed and includes slots or cutouts 11', 11" for respective engagement with a pin 2' mounted on carriage 2 and a pin 10' depending from lever L. The opposite extreme positions of travel of oscillating crank shaft 10, as defined or regulated by stoppers 9 and 9', correspond respectively to the first position of the carriage in which supplementary lens 4 is disposed remote from or out of the optical path of principal lens 1, and the second position of carriage 2 in which the optical axes of both supplementary lens 4 and principal lens 1 coincide.

In the apparatus of the second embodiment shown in FIG. 2, engagement of a rack 2a attached to carriage 2 with a driving pinion 13 connected to a reversible motor 12 enables the carriage to reciprocate within and along its movable range until the edge of carriage 2 contacts one of the change-over stoppers 14, 14'. A predetermined stopping position of the carriage for a selected degree of magnification is achieved through transmission of a pulse signal from a pulse generator 15 and subsequent counting and reading thereof by a controller 16 as the carriage is displaced from a position of contact with one of the change-over stoppers 14, 14'. When the number of pulses counted by controller 16 reaches a predetermined count corresponding to a given magnification, controller 16 shuts off electric power to motor 12 and a position fixing claw 17 (FIG. 3) is engaged with click stops P1 or P2 provided on fixed frame 6 at predetermined magnification positions. In the apparatus, each change-over stopper 14, 14' transmits a signal to controller 16 when carriage 2 contacts it, whereby controller 16 causes a reversal in the direction of rotation of reversible motor 12 while continuing to add to or subtract from the total count derived from the pulse signal of generator 15.

The disclosed operative control of the apparatus is effected by a central processing unit of a microcomputer provided in controller 16. Thus, all of the various required control sequences—for the copying operation and for changing the magnification, by way of example—are stored in memory accessed by the central processing unit.

Although specific selecting means, such as a plurality of buttons, for changing the magnification by particular amounts are not shown in the drawings, it should be understood that operative movement of the principal and supplementary lenses are begun when such a selecting means is operated to obtain a given magnification as desired. Since more than two stopping positions of the carriage—each corresponding to a particular degree of magnification—can readily be provided in the driving and stopping device shown in FIG. 2, such an arrangement can also be utilized in the embodiment of FIG. 4 incorporating two supplementary lenses arranged on opposite sides of principal lens 1 to achieve 3 steps of magnification. The arrangement is equally applicable to a projection device in which separate sliding rails, each holding two supplementary lenses, are arranged in front of and behind the principal lens for changes in magnification of 4 steps or more. It should also be noted that a slide clutch (no reference symbol) to prevent a possible overload caused by stopping of the carriage is provided between motor 12 and pinion gear 13.

Figure 3:
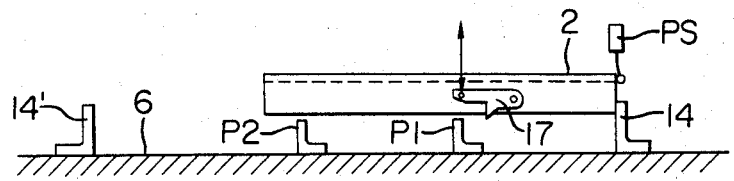
FIG. 3 is a diagrammatic side view of an assembly for stopping the carriage at predetermined positions in accordance with the invention.

FIG. 4 illustrates an embodiment of the apparatus wherein carriage 2 is reciprocated by unidirectional rotation of a drive shaft through a driving roller 19 so as to provide a predetermined length of optical path for a selected degree of magnification. It should be understood that the term length of optical path indicates the distance between an original plane where an original to be copied or printed is positioned and the lens position, or the distance between the lens position and the focusing plane for a photosensitive member (such as an electrically chargeable photoconductive member for a copier) or a photosensitive film (for an enlarging machine or the like). A slider 22 depending from a holding member 23 is provided on a chain 21 stretched between driving roller 19 on the drive shaft of a unidirectional rotation motor (not shown) and a driven roller 20. Carriage 2 is caused to reciprocate with movement of slider 22 which is set in a longitudinal channel 24' of a member 24 carried on carriage 2. By operation of the controlled stopping means (as shown in FIGS. 2 and 3), carriage 2 can be assured to stopping at each of several fixed positions: where the carriage is in focus using only principal lens 1, where the carriage is in focus such that the optical axes of supplementary lens 4' and principal lens 1 coincide, and where the carriage is in focus and the optical axes of supplementary lens 4 and principal lens 1 coincide.

PS designates a standard position switch which is connected so that when carriage 2 contacts switch PS, the controller clears and resets the then-current pulse number count and begins anew its constant updating of the pulse signal received by it as a result of further displacement of the carriage. When the pulse number or count of the signal read thereby coincides with the stored pulse number of a designated variable magnification, the motor is stopped and the position fixing claw 17 pivotally provided on the carriage is clicked into engagement in the corresponding click stop position P1, P2 or P3.

Although the precise control method of claw 17 has not been described, it is urged upwardly (in FIG. 4) by a spring S and, when the pulse number read by the controller corresponds to a predetermined count stored in computer memory, the claw is forced or pressed downwardly against the spring urgency by an electromagnet (not shown). Thus, if an operator selects or designates a variable magnification corresponding to the stop position of click stop or stopping member P1 while position fixing claw 17 is engaged with click stop P2 or P3, the controller energizes the electromagnet to disengage claw 17 and thereby enable the motor to run. Carriage 2 is accordingly displaced to the left in FIG. 4 and, due to a continuing lack of coincidence of the pulse number read and the pulse number designated, the carriage moves to its leftward limit position without stopping and then moves to the right to return to its home position at which switch PS is provided. When carriage 2 contacts standard position switch PS, its direction of movement is reversed until, in moving again to the left, it reaches the P1 position and there stops when the pulse number read—which reading began anew on contact of carriage 2 with switch PS—coincides with the predetermined selected count. In order to prevent an overload resulting from stoppage of carriage 2 with position fixing claw 17 engaged with one of the click stops P1, P2 or P3, a slide clutch or the like may naturally be provided between the motor and drive shaft. The pulse number corresponding to given magnifications is located in the memory of the central processing unit of a microcomputer provided in the controller.

The variable magnification projection device according to the present invention has particular merit in that the supplementary lenses are moved into and out of the optical path of principal lens 1 in linear fashion, its structural arrangement and construction are simple, and changing of the projection magnification for 2 or more steps can be accomplished with precision and ease.

Of course, the oscillating crank shaft 10 in the FIG. 1, embodiment may be driven manually or by a motor, the swing lever 11 can be fixed to the carriage for obtaining the necessary driving force, and the stoppers 9 and 9' can comprise the stoppers for carriage 2. In addition, the positions of the carriage at which it contacts change-over stoppers 14, 14' in the FIG. 2 apparatus may correspond to the variable magnification projection positions at which motor 12 is stopped. In the embodiment of FIG. 4, standard position switch PS can alternatively be actuated by slider 22 on chain 21 and the pulse generator can be one that generates the pulse signal during running of the chain.

Furthermore, in place of providing a controller and a pulse generator, limit switches actuated by displacement of the carriage can be arranged at the positions of the various click stops; then, each time the selecting means is operated, the position fixing claw is disengaged from the click stop with which it is then engaged, the carriage is further displaced, and the respective limit switches are actuated at succeeding click stop positions. In addition, the position fixing claw may be implemented as a ratchet so that it will not engage the click stops during return movement of the carriage, thereby avoiding a decrease in the efficiency of magnification selection.

What is claimed is:

1. In a variable magnification projection device for an electrophotographic copying machine having a principal lens displaceable along the axis of its optical path and a supplementary lens for movement into and out of the optical path at a fixed conjugate distance from the principal lens as the latter is displaced along said path,
   a frame,
   a carriage fixedly carrying the principal lens and displaceable within a predetermined range along said optical path with respect to said frame,
   sliding rail means on said carriage extending substantially perpendicularly through said optical path and having an opening defined therein through which the axis of the optical path passes, said supplementary lens being movable along the extension of said sliding rail means between a first position in which the supplementary lens is disposed remote from said optical path and a second position in which the supplementary lens is disposed in said optical path,
   guide means defined on said frame,
   means coupling said supplementary lens to said guide means for causing said supplementary lens to be positioned in said first position thereof remote from the optical path when said carriage is disposed at a first carriage position within said predetermined range and for causing said supplementary lens to be moved along said sliding rail means to said second position thereof remote from the optical path on displacement of said carriage in one direction along the optical path to a second carriage position within said predetermined range, and
   means for preventing further displacement of said carriage beyond said first carriage position when the supplemental lens is disposed at said first position thereof and for preventing further displacement of said carriage when the supplemental lens is disposed at said second position.

2. In a variable magnification projection device in accordance with claim 1,
   a second supplementary lens movable along the extension of said sliding rail means between a third position in which the second supplementary lens is disposed remote from the optical path and said second position in which the second supplementary lens is disposed within the optical path, said coupling means further coupling said second supplementary lens to said guide means for causing said second supplementary lens to be disposed in said third position thereof when the carriage is disposed in said first and second carriage positions, for causing said first supplementary lens to return to said first position thereof remote from the optical path on further movement of said carriage along said one direction to a third carriage position beyond said second carriage position within said predetermined range, and for causing said second supplementary lens to be moved along said sliding rail means to said second position in the optical path when said carriage is moved in said one direction to a fourth carriage position beyond said third carriage position within said predetermined range, and said displacement preventing means further preventing displacement of said carriage when the second supplemental lens is disposed in said second position in the optical path.

* * * * *